US012623323B2

(12) United States Patent
Shetty

(10) Patent No.: US 12,623,323 B2
(45) Date of Patent: May 12, 2026

(54) FILTER REMOVAL TOOL AND METHOD

(71) Applicant: Volvo Truck Corporation, Gothenburg (SE)

(72) Inventor: Abhishek Narayana Shetty, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 429 days.

(21) Appl. No.: 18/118,774

(22) Filed: Mar. 8, 2023

(65) Prior Publication Data

US 2023/0321803 A1      Oct. 12, 2023

(30) Foreign Application Priority Data

Apr. 7, 2022    (EP) ..................................... 22167123

(51) Int. Cl.
*B25B 27/00*          (2006.01)
(52) U.S. Cl.
CPC ...... *B25B 27/0042* (2013.01); *B01D 2201/24* (2013.01)
(58) Field of Classification Search
CPC ..... B25B 27/0042; B25B 27/00; B25B 13/02; B25B 13/04; B25B 13/06; B25B 13/48; B25B 27/0035; B25B 27/0057; B25B 27/02; B25B 27/14; B01D 2201/24; B01D 27/00; B01D 35/14; B01D 35/16;
(Continued)

(56) References Cited

U.S. PATENT DOCUMENTS 3,710,930 A      1/1973  Owdom
4,177,529 A  *  12/1979  Sikula, Jr. .............. B01D 27/00
                                                                          141/330
(Continued)

FOREIGN PATENT DOCUMENTS

CN          214520024 U      10/2021
DE          3436154 A1        4/1986
JP          2014227971 A    12/2014

OTHER PUBLICATIONS

Communication pursuant to Article 94(3) EPC, European Patent Application No. 22167123.3, mailed Jul. 15, 2024, 4 pages.
(Continued)

*Primary Examiner* — Monica S Carter
*Assistant Examiner* — Kent N Shum
(74) *Attorney, Agent, or Firm* — Sage Patent Group

(57)          ABSTRACT
A tool for draining and removing a vehicle filter (e.g. an oil filter, an air filter, a coolant filter, a fuel filter, or the like) from a vehicle, and a method for removing a vehicle filter from a vehicle. The tool includes a perforator for providing a perforation in a vehicle filter; a housing comprising a cavity and an opening therein for receiving a fluid from a perforation in a vehicle filter into the cavity, the perforator at least partially located in the cavity, and the opening being configured such that least one of the perforator and a vehicle filter are positionable therethrough; and a gripper connected to the housing and comprising a gripping surface for engaging and gripping a vehicle filter to restrict relative rotation between the gripper and the vehicle filter to permit rotation of a vehicle filter by rotation of the tool.

11 Claims, 6 Drawing Sheets

(58) Field of Classification Search
CPC . B01D 35/30; B25F 1/00; B67C 11/00; F16D
2125/16
See application file for complete search history.

(56) References Cited

U.S. PATENT DOCUMENTS

| | | | | |
|---|---|---|---|---|
| 4,951,721 A * | 8/1990 | Moore | .................... | B67C 11/02 |
| | | | | 141/331 |
| 5,421,223 A | 6/1995 | Wawrzyniak | | |
| 5,694,990 A * | 12/1997 | Crima | .................... | B01D 35/16 |
| | | | | 141/330 |
| 8,651,134 B1 * | 2/2014 | Kurtz | ..................... | F16N 31/00 |
| | | | | 141/330 |
| 11,549,411 B2 * | 1/2023 | Pewett | ..................... | F01M 1/10 |
| 2018/0230872 A1 | 8/2018 | Dosky | | |
| 2020/0353900 A1 * | 11/2020 | Yusuf | .................... | G06Q 10/20 |
| 2022/0212322 A1 * | 7/2022 | Owens | .................... | B25B 13/06 |

OTHER PUBLICATIONS

Communication pursuant to A94(3) for EP Patent Application No. 22167123.3, mailed Feb. 27, 2024, 4 pages.
Extended European Search Report for European Patent Application No. 22167123.3, mailed Jul. 22, 2022, 7 pages.

* cited by examiner

FILTER REMOVAL TOOL AND METHOD

CROSS REFERENCE TO RELATED APPLICATION

This application claims foreign priority to European Application No. 22167123.3 filed on Apr. 7, 2022, the disclosure and content of which is incorporated by reference herein in its entirety.

TECHNICAL FIELD

The present disclosure relates to a tool for draining and removing a vehicle filter from a vehicle and a method for removing a vehicle filter from a vehicle.

BACKGROUND ART

The changing of filters in a vehicle, for example oil filters, coolant filters, fuel filters and air filters, is a process that may need to be carried out regularly. In some cases, filters may be required to be changed every year, or perhaps even more often in the case of heavy use of a vehicle.

Many vehicle undercarriage operations of today may involve tasks and operations in uncomfortable positions for technicians. In particular, the filter changing process may be labour-intensive and physically demanding for a technician in the workshop. For example, during the oil filter changing operation in many vehicles, the technician may be required to adopt a difficult position to access an oil filter and may result in oil spills from the filter or technicians developing their own methods of filter removal. Similarly, other vehicle filters may be located in difficult-to-reach locations and may require a complex process for their removal. Such processes, whether complex or ad-hoc, may entail risks to personnel, particularly in processes requiring a large number of steps. These processes may also require a high degree of skill from a technician, and may require a large work time to complete, thereby also increasing the likelihood that a technician may be injured during the processes.

There is therefore a need for a tool that reduces the complexity of these processes as well as increases the safety of a technician during the completion of such processes.

SUMMARY

It is an object of the present disclosure to mitigate, alleviate or eliminate one or more of the above-identified deficiencies and disadvantages in the prior art and solve at least the above mentioned problem. According to a first aspect there is provided a tool for removing and optionally draining a vehicle filter (e.g. an oil filter, air filter, fuel filter, coolant filter, or the like) from a vehicle, comprising: a perforator for providing a perforation in a vehicle filter; characterized in that the tool comprises; a housing comprising a cavity and an opening therein for receiving a fluid from a perforation in a vehicle filter into the cavity, the perforator at least partially located in the cavity, and the opening being configured such that least one of the perforator and a vehicle filter are positionable therethrough; and a gripper connected to the housing and comprising a gripping surface for engaging and gripping a vehicle filter to restrict relative rotation between the gripper and the vehicle filter to permit rotation of a vehicle filter by rotation of the tool.

According to some examples, the perforator may comprise a spindle. The perforator may be rotatably connected to the housing via an annular bearing to permit rotational movement therebetween. As such, the perforator may be operated to cleanly and easily provide a perforation in a surface of a filter, for example a base or bottom surface, side surface, or the like.

The perforator may be moveable relative to the housing in the direction of a central axis of the opening. The perforator may be moveable from a retracted configuration in which the perforator is disengaged with an engaged filter in a direction towards the opening of the housing so as to perforate an engaged filter, and may be moveable to a locked configuration in which rotational movement of the perforator relative to the housing is restricted. The perforator may therefore be selectively actuated to provide a perforation in a filter, and to remove a filter, thereby improving the safety and usability of the device.

The perforator may comprise a biasing member for biasing the perforator to the retracted configuration. The biasing member may comprise at least one of a spring and a pneumatic piston. The biasing member may improve the safety of the device, by providing a default position in which the perforator is located in the housing.

The housing may comprise a locking member comprising a corresponding locking profile for engagement with the locking member, thereby restricting or preventing rotational movement between the perforator and the housing.

The perforator may comprise a connection profile for connection of a robotic control device thereto.

The opening may be configured to permit a vehicle filter to be positioned therethrough and the housing may comprise a stopper configured to abut against an engaged filter to limit movement of an engaged filter through the opening. As such, a filter may be able to be easily positioned so as to permit perforation and drainage thereof.

The gripper may be located in the cavity of the housing. The gripper may comprise a rubber gripping surface. The gripper may comprise a clamp mechanism. The gripper may be directly connected to the housing. The gripper may therefore be used to simply and effectively grip and/or hold a filter, and permit rotational movement of the filter when necessary.

The housing may comprise a fluid outlet for expelling a fluid from the cavity, thereby permitting a fluid to be drained from a filter in a safe way that is controllable by a user.

The opening in the housing may be configured to permit a filter to be partially inserted into the cavity through the opening. This may permit the perforation to be made inside the cavity, which may assist in the drainage process by more easily containing a fluid from the filter inside the tool (e.g. the housing).

The tool may comprise a sensor arrangement for sensing the position of the tool relative to a filter.

The tool may comprise an outer receptacle, the housing being located at least partially within and rotatably connected to the outer receptacle to permit rotation between the housing and outer receptacle. This may facilitate usability of the tool by permitting a conduit for receiving a fluid from the tool (e.g. the housing of the tool) to be used without having to be rotated.

The tool may be configured to remove at least one of an oil filter, an air filter, a coolant filter and a fuel filter.

According to a second aspect there is provided a method for removing a vehicle filter from a vehicle, comprising: engaging a gripper of a tool for removing and optionally draining a vehicle filter such that relative rotation between the gripper and the vehicle filter is restricted; perforating the vehicle filter to form a perforation; receiving a flow of fluid from the perforation in the filter into a cavity in a tool housing through an opening therein; rotating the tool to rotate the vehicle filter and remove the vehicle filter from a vehicle.

The method may comprise expelling a fluid from the cavity via a fluid outlet in the housing. Thereby removing a fluid from the tool in a quick manner, and improving the safety of the tool by reducing the likelihood that a fluid will leak from the tool.

The method may comprise engaging the gripper of the tool and rotating the tool by a robotic control device. This removes the need for a user to directly access a filter, which may require a user to be located under a vehicle, and/or access a difficult-to-reach location.

The method may comprise rotating the tool housing within an outer receptacle, the outer receptacle remaining static relative to a user. The method may comprise rotating the tool to remove a vehicle filter such as a vehicle oil filter, air filter, fuel filter, coolant filter, or the like.

Effects and features of the second aspect are to a large extent analogous to those described above in connection with the first aspect. Examples mentioned in relation to the first aspect are largely compatible with the second aspect.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIGS. 1a to 1d illustrate various views of the tool.

FIGS. 2a to f show some steps involved in the use of the tool to perforate and remove a filter from a vehicle.

DETAILED DESCRIPTION

Figures 1A, 1B, 1C:
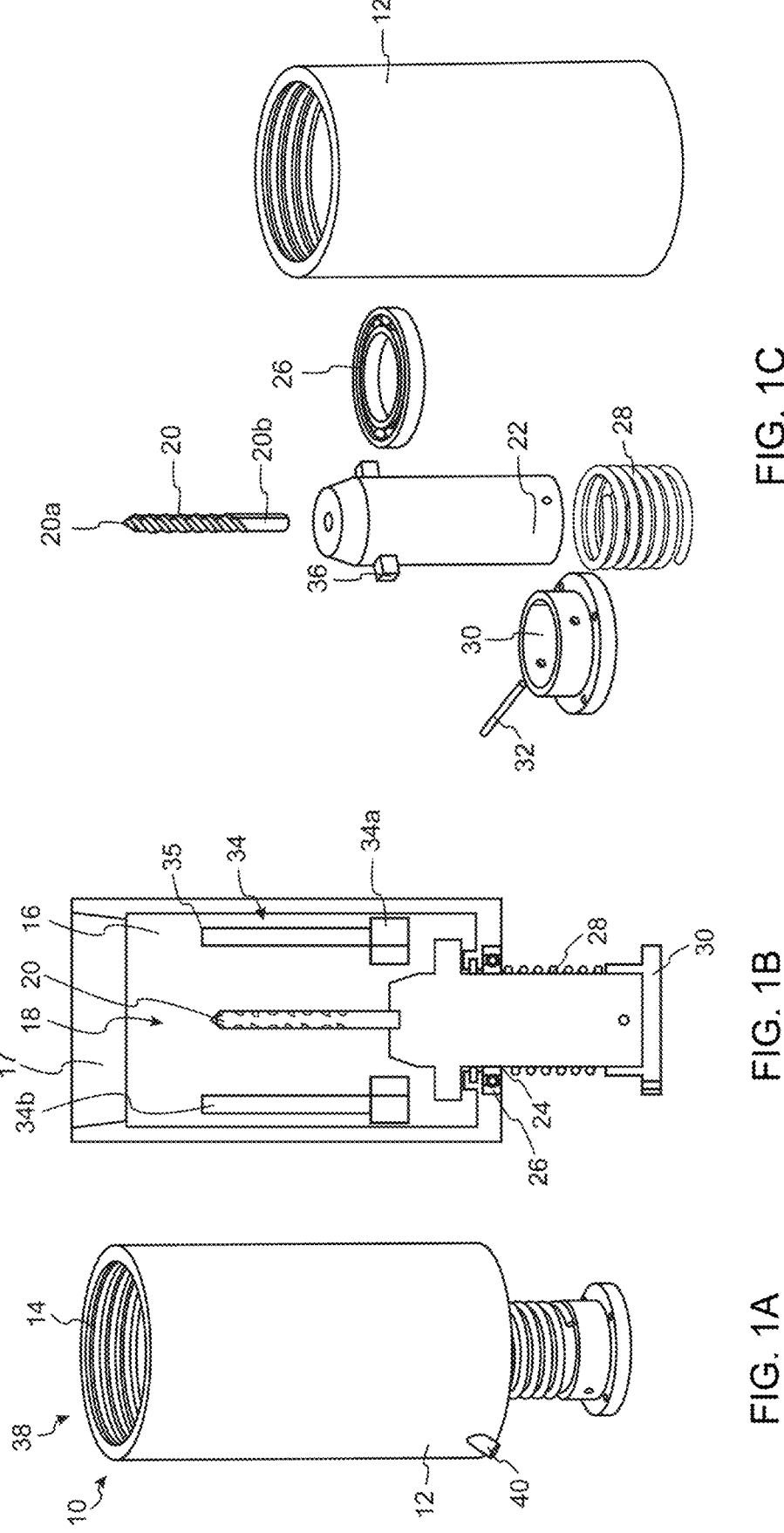

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

The first aspect of this disclosure shows a tool for draining and removing a vehicle filter from a vehicle, comprising: a perforator for providing a perforation in a vehicle filter; characterized in that the tool comprises; a housing comprising a cavity and an opening therein for receiving a fluid from a perforation in a vehicle filter into the cavity, the perforator at least partially located in the cavity, and the opening being configured such that least one of the perforator and a vehicle filter are positionable therethrough; and a gripper connected to the housing and comprising a gripping surface for engaging and gripping a vehicle filter to restrict relative rotation between the gripper and the vehicle filter to permit rotation of an vehicle filter by rotation of the tool.

In use, the gripper of the tool may engage with a vehicle filter (e.g. an oil filter, an air filter, a coolant filter, a fuel filter, or the like) so as to engage the tool with the vehicle filter and prevent rotation therebetween. The perforator may then be configured to engage and perforate a surface of the vehicle filter, for example by movement of the perforator inside the housing in the direction of the opening to contact and perforate a surface of a vehicle (e.g. oil, air, fuel, coolant) filter, or may also be possible by movement of the housing itself with the perforator therein. The vehicle filter may then be drained by permitting a fluid to flow from the perforation and into the housing through the opening therein. The housing may additionally comprise an outlet to enable fluid to be expelled therefrom. Once the fluid has been drained from the vehicle filter the tool may be rotated, thereby resulting in rotation of the vehicle filter, unscrewing it from the vehicle. The described tool may be able to be used to both drain and remove the vehicle filter, which may provide safety benefits to a user by removing the need to use a separate tool, or for a technician to engage in a manual perforation and draining procedure (e.g. with a manual perforation tool), which may increase the complexity of the process, may require direct perforation of a filter by a technician, and may introduce an opportunity for fluid spillage or other accidents. Further, having a single tool that may be engaged with a filter to both drain and remove the filter may allow the process to be more easily automated, as no process may be required for switching between tools. As will be described, in some examples the tool may be used simply to remove the vehicle filter, and no draining may be required, for example in cases where the vehicle filter is an air filter.

FIG. 1a is a perspective view of a tool 10 for draining and removing a vehicle filter from a vehicle, while FIG. 1b illustrates a cross-sectional elevation view of the tool 10. In FIG. 1c, the parts of the tool 10 are illustrated as having been disassembled for clarity.

In the example of FIG. 1a, the tool 10 comprises a housing 12. The housing 12 may have an extruded shape and/or an elongate shape. The housing may have a prismatic shape. Although not illustrated in this example, it may be possible that the sides of the housing 12 are tapered, such that one end has a greater surface area than the other, for example in the case that the housing 12 has the shape of a truncated cone. As is illustrated in this example, the housing 12 has the shape of an extruded circle, or cylinder. In other examples, the housing 12 may have an alternative shape, such as a cuboid or triangular prism.

Here, the housing 12 comprises an opening 14. The opening 14 is located at one end of the housing 12 in this example. The opening 14 is located on a flat surface of the housing 12. The opening has a circular shape, although it should be noted that other shapes of opening may be possible, such as an oval or square shape. The housing 12 comprises a cavity 16 (see FIG. 1b), and the opening 14 may permit access to the cavity 16 in the housing 12. The housing 12 may comprise an internal surface that defines the cavity 16. An internal surface 17 adjacent to the opening 14 may be tapered, as in this example, such that the diameter of the opening 16 is non-constant with the depth of the opening. The opening 14 may have a smaller diameter adjacent the cavity 16, and a larger diameter adjacent an outer surface of the housing 12. The opening may also comprise an uneven e.g. an undulating surface, for example a ridged and/or toothed surface, as is illustrated. Having a tapered opening may assist to permit an object (such as a filter e.g. an oil filter) to be placed through the opening, for example into the cavity 16, and the undulating surface may permit the opening to grip the object placed therethrough when the object comes into contact with the sides of the opening 14. As will be described in the following paragraphs, the opening may function as a gripper.

The opening 14 may comprise a deformable material, such as an elastic material. The deformable material may be positioned on the surface of the opening, and may be uneven, undulated, toothed, ribbed, or the like. The deformable material may be, for example, rubber, a deformable plastic or the like. The deformable material may assist to permit the opening to grip an object therein.

Also illustrated in FIGS. 1a to 1c is a perforator 18. In this example, the perforator 18 is located partially within the housing 12, although it should be noted that in some examples, the perforator may be located fully within the housing 12. The housing 12 may therefore comprise an aperture 24 through which the perforator 18 extends and in which the perforator 18 is positioned. In such examples, the housing 12 may not comprise aperture 24, may be controlled remotely, etc. The aperture 24 is positioned at an end of the housing 12 opposite the opening 14.

The perforator 18 comprises a spindle 20 and a base 22. In this example, the spindle 20 is a shaft that comprises flutes therein and also comprises a tip 20a and a shank 20b. The tip 20a comprises a point or a sharpened edge, which may assist the perforator 18 in perforating a filter. The shank 20b is a solid shaft and is unfluted, and engages with the base 22 to secure the spindle 20 to the base 22. Here, the shank 20b fits into an aperture in the base 22, and may be threaded or held in place by an interference fit, for example. Having a pointed or sharpened edge at the tip 20a and a fluted spindle 20, the perforator 18 may be or comprise a drill bit.

In some examples, the perforator 18 need not be fluted, and the spindle 20 may be a shaft with a pointed tip 20a or sharpened edge located at the tip 20a. In other examples, the perforator 18 may simply be an object that is capable of providing a perforation in a vehicle filter, and need not necessarily comprise a shaft.

As illustrated in FIG. 1b, the spindle 20 may be configurable to be entirely located in the housing 12. In some other examples, the spindle 20 may be partially located within the housing 12. For example the tip 20a of the spindle 20 may be located in the housing, and the shank 20b outside the housing, and as such the spindle 20 may be positioned in the aperture 24. In some other examples, the tip 20a of the spindle may be positioned outside the housing 12, and the shank 20b inside the housing 12, and as such the spindle 20 may be positioned in the opening 14.

The perforator 18 may be rotatably connected to the housing 12, for example rotatably coupled to the housing 12. The perforator 18 may be coupled to the housing via a bearing 26, thereby enabling a rotatable coupling therewith. In this example the perforator 18 is rotatably connected to the housing via an annular bearing 26. The annular bearing 26 may be mounted to the housing 12 and to the perforator 18, in this example the base 22 of the perforator 18. For example, the annular bearing 26 may be mounted in, or around the periphery of, the aperture 24 in the housing 12. The rotatable connection between the perforator 18 and the housing 12 may permit rotation of the perforator 18 within the housing 12, and therefore rotation of the spindle 20a within the housing. Rotation of the spindle 20b may assist the perforator to provide a perforation in a vehicle filter, for example by providing a rotation to the spindle 20a which may provide a better ability to penetrate a surface.

The perforator 18 may be slidably connected to the housing 12, for example slidably connected to the housing 12 via the bearing 26. The slidable connection between the perforator 18 and the housing 12 may permit translational movement of the perforator 18 relative to the housing 12. The perforator 18 may be slidably moveable in the direction of the opening 14, for example in the direction to and from the opening 14. The perforator 18 may be slidably moveable between a retracted configuration (as shown in FIG. 1b) in which the perforator 18 is configurable to be disengaged with an engaged vehicle filter and moveable towards the opening 14 in order to provide a perforation in an engaged vehicle filter (as will be described in more detail in the following paragraphs). To permit slideable movement between the perforator 18 and the housing 12, a gap 25 may exist between the perforator 18 and the housing 12 (see FIG. 1d). For example the diameter of the perforator 18 may be slightly smaller than the diameter of the aperture 24, so as to provide a gap 25 therebetween. The gap 25 between the housing 12 and the perforator 18 may be a small gap, for example having a width in the order of tenths of a millimetre, such as 0.1 mm, 0.5 mm, or the like.

Figure 1D:
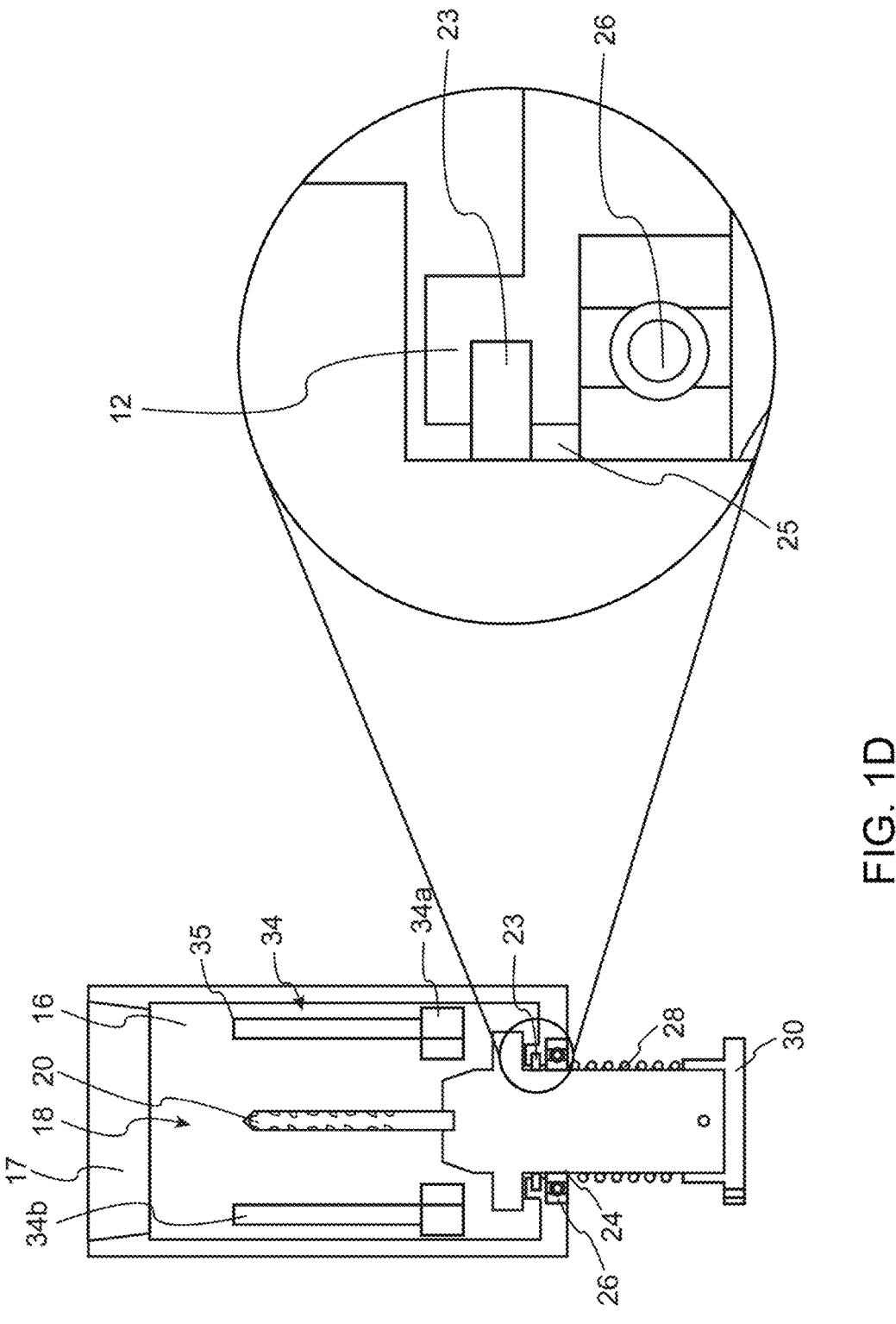

The tool 10 may comprise a sealing arrangement, for example as is illustrated in FIG. 1d. The sealing arrangement may comprise a seal 23 (such as a dynamic seal) positioned between the perforator 18 and the housing 12 (for example in or around the periphery of the aperture 24) so as to prevent fluid leakage from the cavity 16 of the housing 12 though the aperture 24. The sealing arrangement may be or comprise a seal such as a dynamic seal located in the gap 25 between the perforator 18 and the housing 12, as is illustrated. In this example, the seal 23 is mounted to the housing 12, and in particular in a slot in the housing 12. In other examples, the sealing arrangement may comprise additionally or alternatively a seal that is connected to the bearing 26. The sealing arrangement may permit translational movement of the perforator 18 relative to the bearing 26. Rotational movement of the bearing 26 relative to the perforator 18 may be restricted, such that rotational movement of the perforator 18 relative to the housing may require rotation of the bearing 26. In some examples, the perforator 18 may comprise a protrusion, rib, ridge, or the like thereon (e.g. extending longitudinally therealong) for engaging a corresponding notch therein to enable translational movement of the perforator 18 relative to the bearing 26, while reducing the likelihood of, or preventing, rotational slip between the bearing 26 and perforator 18.

The perforator 18 may be indirectly connected to the housing 12, for example indirectly connected to the housing via the bearing 26. Indirect connection of the perforator 18 to the housing 12 via the bearing 26 may permit both relative translational and rotational movement of the perforator 18 relative to the housing 12 as previously described, allowing a user to rotate and move the perforator 18 towards a vehicle filter without requiring rotation of the housing 12.

The perforator 18 may additionally comprise a biasing member 28. The biasing member 28 may bias the perforator 18 towards the retracted configuration (e.g. may urge the perforator to move in a direction away from the opening 14). The biasing member 28 may improve the safety of the tool 10 by urging the spindle 20a into the retracted configuration in which it is located entirely within the housing 12 and away from the opening 14, thereby reducing the likelihood of the spindle 20a coming into contact with a user accidentally when not in use. The biasing member 28 may be a spring, such as a helical as in this example. In some examples, the biasing member 28 may be pneumatic biasing member 28, for example a pneumatic annular piston, or a series of pneumatic annular pistons. The biasing member 28 may circumscribe the perforator 18, e.g. the base 22 of the perforator. The biasing member 28 may be located outside of the housing 12, as in this example. It should be noted that in some examples, the biasing member 28 could be located inside the housing, while still providing a desired biasing force on the perforator 18. The biasing member 28 may abut the housing 12, for example an external surface of the housing 12. The biasing member 28 may abut the base 22, for example a flange, shoulder, tooth etc. extending from the base 22, or connected to the base 22. The biasing member 28 may abut or engage the bearing 26 at a first end thereof. The biasing member 28 may abut a component connected to the base 22, for example a connection component 30 (described in more detail in the following paragraphs) located at a second end thereof, that may be connected, coupled, fastened or the like to the base 22.

The base 22 may have a larger diameter than the spindle 20. The base 22 may be partially located in the housing 12, as described in this example. In some other examples, the base 22 may be entirely located outside of the housing 12 (e.g. outside of the cavity 16 of the housing 12). In such examples, the spindle 20 may be located in the aperture 24. The base 22 may assist to manoeuvre the perforator 18. Having a base 22 with a wider diameter than the spindle 20 may assist in the maneuverability of the perforator 18, and for example may permit the perforator 18 to be rotated at high speed without damaging the perforator 18.

The perforator 18 may comprise a connection profile for permitting connection of a control tool thereto. The connection profile may be located on a connection component 30 as is illustrated in FIG. 1b, for example, or may be formed with or into the perforator 18, for example on the base 22 of the perforator 18. In some examples, the connection profile may be defined by the perforator 18, such as by the base 22 of the perforator. The control tool may be a robotic control device. The connection profile may be located on the base 22. The connection profile may be in the form of a protrusion or flange that extends from the perforator 18. The connection profile may comprise a rib, lip, aperture, groove or the like to mate with a corresponding profile of a control tool. The connection profile may be integrally formed with the perforator, although in some examples (such as the one illustrated in FIGS. 1a-d), the connection profile may be on a connection component 30 that is attached to the perforator 18, in this example to the base 22 of the perforator 18.

The connection profile may permit the perforator 18 to attach to a robotic connection, such as a robotic arm. The connection profile may be shaped so as to alert a robotic connection that is has successfully connected to the connection profile. The connection profile may therefore be for permitting the tool 10 to be operated by a robot, or robotic control device.

Here, the connection component 30 is in the form of a cap that may connect to the base 22 of the perforator 18. Here, the connection component 30 is held in place by a locking pin 32. Such a connection may permit the connection component 30 to be easily replaced, for example if damaged, or if required to be operated by a different (e.g. an updated or more advanced) robotic control system.

The tool 10 may further comprise a stopper 34. The stopper 34 may function to limit or restrict movement of a vehicle filter relative to the housing 12. The stopper 34 may prevent contact between a filter and the perforator 18 when the perforator is in the retracted configuration. The stopper 34 may assist to prevent premature perforation of a filter, thereby improving the safety of the device, for example by preventing a fluid from flowing from a perforation in a filter before a user is ready, e.g. before a filter is correctly engaged with the filter, such as before a gripper of the tool has engaged the filter.

The stopper may define or comprise an abutment surface 35 against which a vehicle filter may abut to limit or restrict movement of a vehicle filter relative to the housing 12. The abutment surface 35 may be located inside the housing 12, e.g. in the cavity 16, or may be located on or around the periphery of the opening 14. The abutment surface 35 may be located proximate the opening 14, for example inside the cavity 16 and proximate the opening 14. The abutment surface may be located closer to the opening 14 than the perforator 18 in the retracted configuration.

The stopper 34 may be located inside the housing 12, for example at least partially or entirely located inside the housing 12, such as inside the cavity 16 of the housing 12. The stopper 34 may be fully or at least partially located proximate the opening 14. The stopper 34 may be fully or at least partially located closer to the opening 14 than the perforator 18 in the retracted configuration. In this example, the stopper 34 is located entirely inside the housing 12. The stopper 34 may be connected to the internal surface of the housing 12, and may be connected in any appropriate way such as by chemical bonding, welding, interference fitting, or the like. In some examples, the stopper 34 may be integrally formed with the housing 12. The stopper 34 may be defined by the housing 12, e.g. by a protrusion (e.g. a rib, lip, tooth, etc.) or protrusions on the internal surface of the housing 12. Where the stopper 34 is or comprises a protrusion or protrusions, the protrusion or protrusions may comprise or define the abutment surface 35. The protrusion or protrusions may be located proximate the opening 14, e.g. in the cavity 16 and closer to the opening 14 than the perforator 18 in the retracted configuration. The stopper 34 may have a shape of a full or partial annulus. The stopper 34 may comprise be or comprise a collar. The collar may be a continuous collar or a discontinuous collar, comprising a plurality of sections. The collar may comprise the abutment surface 35 (e.g. all or part thereof). The collar may be located proximate the opening 16, e.g. inside cavity 16 and proximate the opening 14. The collar may be located closer to the opening 14 than the perforator 18 in the retracted configuration.

Alternatively and as illustrated in FIG. 1b, the collar may form a stopper base 34a for example. From the stopper base 34a may extend one or a plurality of protrusions 34b. A protrusion 34b may define or comprise the abutment surface 35 to prevent or restrict movement of the filter, for example to prevent or restrict movement of the filter through the opening 14. The protrusion 34*b*, or the plurality thereof, may comprise the abutment surface 35 at the tip thereof. The protrusion 34*b* may be elongate in shape, and may have an extruded shape such as a prismatic shape such as a cylinder, cuboid, triangular prism, or the like. Having an elongate shape of protrusion 34*b* may assist to reduce the weight of the tool 10. Each protrusion may be the same length, although it should be noted that it may be possible to have protrusions of different lengths.

The protrusions 34*b* may extend in a longitudinal direction in the housing 12. The protrusions 34*b* may comprise a first end proximate the opening 14 and a second end distal to the opening 14. The proximal end of the protrusions 34*b* (or at least one of the protrusions) may be located closer to the opening than the perforator 18 (e.g. the spindle 20 of the perforator 18) when the perforator 18 is in the retracted configuration.

The base 34*a* may assist to provide a secure attachment of the stopper 34 to the housing 12. Although the base 34*a* has been described as a collar, in other examples the base 34*a* may comprise a different shape, such as a cube or cuboid. The stopper 34 may comprise more than one base 34*a*, each of which may be connected to the housing 12 in a way as previously described. Each base may comprise one or a plurality of protrusions 34*b*. Each base 34*a* may have the same longitudinal positioning in the housing, and/or each base 34*b* may be located equidistant from the opening 14.

In some examples the stopper 34 may comprise only protrusions 34*b* without the requirement for a base 34*a*. In such examples the protrusions 34*b* may be connected to the housing 12 (e.g. directly to the internal surface of the housing). The protrusions 34*b* may be integrally formed with the housing. The protrusions 34*b* may be in the form of a rib, lip, ridge etc. extending from the internal wall of the housing 12.

The perforator 18 may comprise a range limiter (in this example defined by protrusion 36) for limiting the movement of the perforator 18 relative to the housing 12. The perforator 18 may comprise a locking profile which may engage with a corresponding locking member or members of the range limiter to prevent limit the movement thereof. In some examples, the range limiter may comprise a translational locking member to prevent translational movement of the perforator 18, and a rotational locking member to prevent rotational movement of the perforator 18.

The perforator 18 may comprise a protrusion 36 (see FIGS. 1*b* to 1*d*, for example) that forms part of the range limiter. The protrusion may provide be or comprise a locking profile on the perforator 18. In some examples the perforator 18 may comprise a plurality (e.g. two, three, four or more) protrusions 36. The protrusions 36 may be located on the base 22 of the perforator 18. The range limiter may abut against the housing 12 (e.g. the internal surface of the housing 12) to limit movement of the perforator 18, for example to limit translational movement of the housing. In this example, the perforator 18 comprises a protrusion 36 that may abut against a base of the housing 12 to limit movement (e.g. translational movement) of the perforator 18 away from the opening 14. The protrusion 36 may abut against an internal wall of the housing 12 to limit movement of the perforator 18 in the housing. The range limiter may abut against the housing 12 to oppose the force produced by the biasing member 28. As such, the internal wall, e.g. the base of the housing 12, may be considered to be a locking member (e.g. a translational locking member) that may engage with a locking profile on the perforator 18 (here, the protrusions 36) to prevent translational movement of the perforator 18. When the range limiter abuts against the housing 12, the perforator 18 may be considered to be in the retracted configuration. In this example, the range limiter comprises a protrusion 36 on the base 22, where the base is located partially within the housing 12 and through the aperture 24, and prevents the base from being forced out of the aperture 24 and housing 12 as a result of the biasing member 28.

The range limiter may function to limit rotational movement of the perforator 18 relative to the housing 12. The range limiter may comprise an abutment surface to prevent rotational movement of the perforator 18. For example, the housing 12 may comprise a protrusion, mass, object or the like therein comprising an abutment surface to prevent rotational movement of the perforator 18, and which may function as a rotational locking member. The protrusion 36 on the perforator 18 may be configurable to abut against the abutment surface. The abutment surface may be located on the stopper 34, for example on the base 34*a* of the stopper 34, or in some examples may be on one or a plurality of protrusions 34*b* of the stopper 34. The stopper 34, or at least a portion thereof, may therefore also form part of the range limiter. The stopper 34, or at least a portion thereof, may function as a rotational locking member.

To engage the locking profile of the perforator 18 with the rotational locking member (e.g. the stopper 34), the perforator 18 may be configured (e.g. moved, rotated, slid, etc.) to a locked configuration. In the locked configuration, the perforator 18 may be located closer to the opening 14 than in the retracted configuration. The rotational locking member may comprise a locking profile for engagement with the locking profile of the perforator 18, such as a notch, groove, indent or the like. In the locked configuration, rotational movement of the perforator 18 relative to the housing 12 may be prevented, and therefore rotational movement of the perforator 18 will also result in rotational movement of the housing 12.

The perforator 18 may be configurable to engage both the rotational and the translational locking member. The perforator 18 may be configurable to engage either the rotational or translational locking member in any given configuration. For example, in the retracted configuration, the perforator 18 may engage the translational locking member, whereas in a locked configuration, the perforator 18 may engage the rotational locking member.

The range limiter may therefore function to assist a user in correct operation of the tool 10, by permitting the perforator 18 to reach desirable configurations for use. However, it should be noted that the function of a range limiter may, in some examples, be performed by actions of a user without the need to have the range limiter exactly as described above.

As previously described, the tool 10 may comprise a gripper 38. The gripper 38 may function to grip and hold a vehicle filter relative to the tool 10 (e.g. the housing of the tool 10) so as to prevent or restrict movement (e.g. rotational movement) of the filter relative to the tool 10. The gripper 38 may be or comprise a deformable material, such as rubber or a deformable plastic, configured to deform around a vehicle filter when in contact with the vehicle filter to grip the filter. The gripper 38 may therefore passively grip the vehicle filter, as a result of the vehicle filter coming into contact with the gripper 38.

In some examples, the gripper 38 may actively grip a filter. For example, the gripper 38 may be or comprise a moveable part such as a jaw, pincer, clamp or the like, which may be actuated to grip a filter.

The gripper 38 may be connected to the housing 12, for example directly or indirectly connected to the housing 12. The gripper 38 may be located (at least partially) on the housing 12. The gripper 38 may be located on the internal surface of the housing 12. The gripper may be located on an external surface of the housing 12, for example an external surface of the housing 12 adjacent the opening 14 in the housing 12. The gripper 38 may be located in the cavity 16. The gripper 38 may be located adjacent the opening 14, or in this example is located on the surface of the opening 14. The opening 14 may be or at least partially or wholly define the gripper 38. The gripper 38 may be the surface of the opening 14, which as previously described may be uneven, undulating, toothed, or the like, to improve grip between a filter and the gripper 38. The gripper 38 may comprise a coated surface to improve the grip thereof, for example a surface coated in a deformable material. The gripper 38 may comprise a rubber-coated surface.

Figures 2A, 2B, 2C:
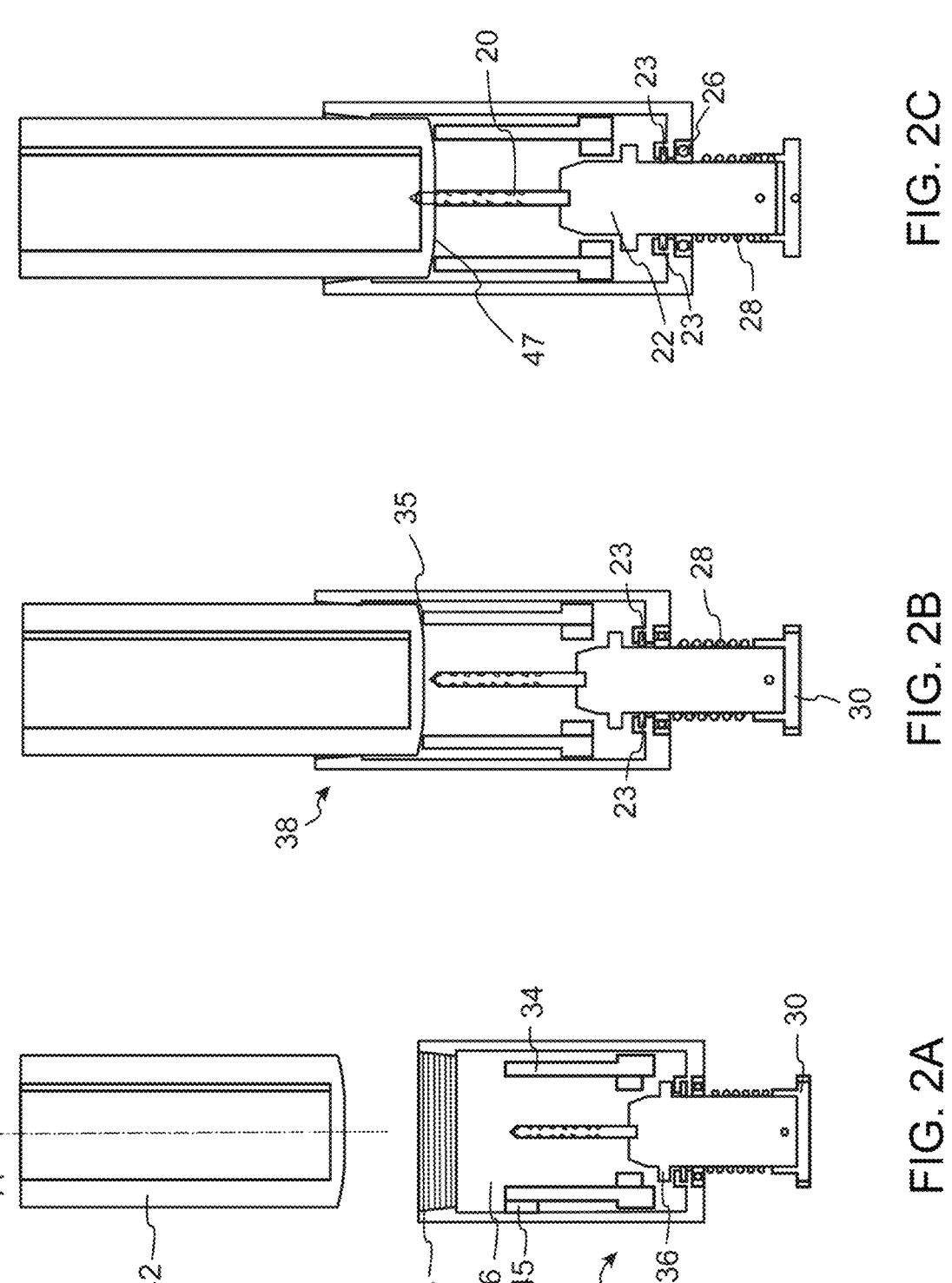
Figure 2F:
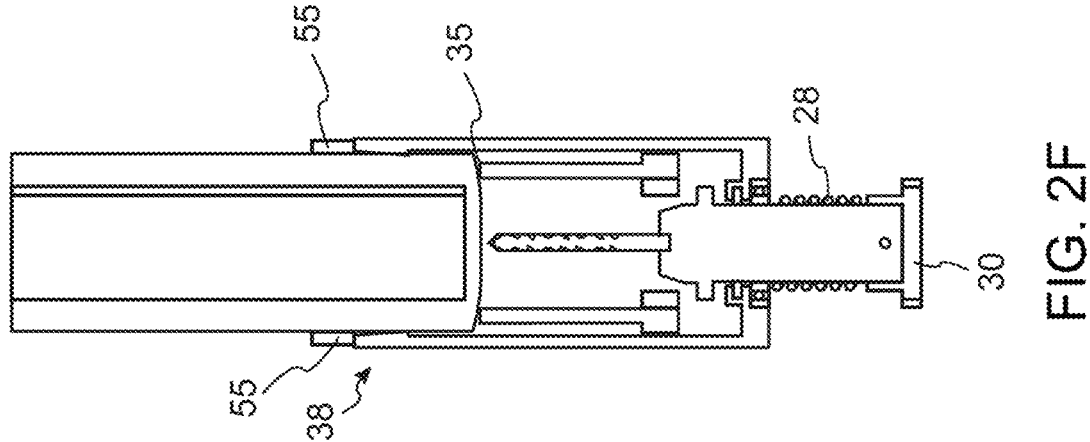

The gripper 38 may additionally or alternatively comprise a clamp 55 (illustrated in FIG. 2f). The clamp may be, for example located around the periphery of the surface of the opening 14, and may be operable by a user to provide grip to a filter, and hold the filter relative to the housing 12.

As illustrated in FIG. 1a, the tool 10 may comprise a fluid outlet 40, which may permit a fluid to flow from the housing 12. The housing 12 may therefore comprise a fluid outlet 40. The fluid outlet 40 may permit a fluid to be expelled from the housing 12 (e.g. the cavity 16 of the housing), for example a fluid that has been drained from a filter. The fluid outlet 40 may be located at a base of the housing 12. The fluid outlet 40 may be located at an opposite end of the housing 12 to the opening 14. The fluid outlet may comprise a conduit attachment profile for the attachment of a conduit thereto, to receive a fluid expelled from the housing 12.

FIGS. 2a-f illustrate an example of steps involved in a method of removing, and in this case draining, a vehicle filter 42 from a vehicle (not illustrated). Here, the vehicle filter 42 may be an oil filter, although it should be noted that at least some, or all, of the described steps may be taken to equally remove other vehicle filters, such as an air filter, coolant filter or fuel filter.

Although not illustrated, the tool 10 may be mounted to a robot, such as a robotic control device, which may be used to operate the tool 10. For example, the robotic control device may comprise a control unit that is able to remove a vehicle filter without intervention from a user. In some examples, the robotic control device may be remotely controlled by a user.

In FIG. 2a, the tool 10 may be brought into alignment with a vehicle filter 42 to be removed. The tool 10 may be connected to a robotic control device, for example the connection component 30 of the tool may be connected to a robotic control device. Schematically illustrated in FIG. 2a, the tool 10 may comprise and/or cooperate with a sensor arrangement to identify the position of the tool. A robotic control device may then receive a signal from the sensor arrangement in order to correctly align the tool 10 with the filter 42. The sensor arrangement may comprise a sensor 45 or a plurality of sensors 45. A sensor 45 may be located on the tool 10, for example on the housing 12 of the tool 10, inside the cavity 16 of the tool, on the filter 42, or any other appropriate location. The sensor arrangement may comprise an optical sensor, a pressure sensor, or the like.

The tool 10 may be aligned with, for example, a central (e.g. longitudinal) axis 44 of the filter 42. The tool 10 may align the central axis 44 of the tool with a central axis extending through the centre of the opening 14. The tool 10 may align the centre axis 44 of the filter 42 with a central axis of the perforator 18. The central axis of the perforator 18 may be aligned with the central axis 44 of the opening.

As the tool 10 is aligned with the filter 42, the perforator 18 may be located in the retracted configuration, as is illustrated in FIG. 2a, such that the protrusions 36 of the perforator 18 abut against a base surface of the housing 18, adjacent the periphery of the aperture 24, and such that the stopper 34 (e.g. an extremity of the stopper) is located closer to the opening 14 than the perforator 18 (e.g. an extremity of the perforator).

Shown in FIG. 2b, the tool 10 is brought closer to the filter 42 such that the filter 42 is engaged by the tool 10. In this example, the filter 42 is engaged by the gripper 38 of the tool 10, and the filter 42 is located through the opening 14 such that a portion of the filter 42 is located in the cavity 16 and in the opening 14. In this example, the gripper 38 is located on the surface of the opening 14, and the opening 14 is dimensioned to be the same diameter or width, or of a larger diameter or width, than the diameter or width of the filter 42. As such, in this example the filter 42 is able to fit inside the opening 14. The gripper 42 may comprise a deformable material, which in this example is a rubber material located on the surface of the opening 14, which may be of a thickness equal to or more than the difference in width or diameter between the filter 42 and the opening 14. Upon engagement between the tool 10 and the filter 42 (e.g. engagement between the gripper 38 and the filter 42), the gripper 38 may deform so as to grip the filter 42, and may additionally provide a fluid seal between the gripper 38 and the filter 42. As the gripper 38 is located around the periphery of the opening 14 (e.g. on or adjacent the opening 14), the fluid seal provided by the gripper 38 may also mean that the cavity is sealed at the opening 14.

In another example, for example where the filter 42 comprises a greater diameter or width than the opening 14, the opening 14 may be positioned on a surface of the filter 42, without the filter 42 extending through the opening 14. In such examples, the gripper 38 be extend to, or be located on, the outer surface of the housing 12, for example adjacent and around the periphery of the opening 14.

The gripper 38 may comprise a clamp 55 (see FIG. 2f), which may be connected to the housing. The clamp 55 is schematically illustrated in FIG. 2f, surrounding the filter 42. The clamp 55 may be located adjacent the opening 14, and may be operable to clamp around the filter 42, for example around the circumference of the filter 42.

As illustrated in FIG. 2b, as the filter 42 is engaged with the tool 10, the perforator 18 may remain in the retracted configuration. In this example, the filter 42 is extended through the opening 14 until coming into contact with the stopper 34, which may limit movement of the filter 42 through the opening 14. For example, the stopper 34 may permit the filter 42 to be extended through the opening 14 such that no contact between the perforator 18 and the filter 42 is possible when the filter 42 is in the retracted configuration. The stopper 34 may increase the safety of use of the tool 10, as it may significantly reduce the likelihood that the tool will be prematurely perforated, which may have the effect of inadvertently leaking oil or another fluid on a user. In addition to the stopper 34 illustrated, the tool 10 may comprise a sensor as part of the sensor arrangement that is configurable to sense the degree to which the filter 42 has been positioned through the opening 14, and may prevent further movement of the filter 42 before the filter 42 reaches the perforator 18, which may function as a further safety measure.

Once the filter 42 is engaged with the tool 10, the perforator 18 may be configured to provide a perforation in a surface of the filter 42, as is illustrated in FIG. 2*c*. To do so, the perforator 18 may be moved from the retracted configuration as illustrated in FIGS. 2*a* and *b* in a direction towards the opening 14 of the tool 10. As the perforator 18 is moved, it contacts a lower surface 47 of the filter 42 and presses against that lower surface 47, to perforate the lower surface 47. In this example, the perforator 18 comprises a spindle 20 comprising flutes therein, and is also rotatably connected to the housing 12 via an annular bearing 26, and therefore may be rotated relative to the housing 12 so as to improve the ability of the perforator 18 to perforate the filter 42. In this example, the perforator 18 may function as a drill. In other examples, the perforator 18 may comprise a spindle 20 without flutes, and may not be supported by an annular bearing. As such, in some examples, the perforator may not need to rotate in order to provide a perforation in the filter 42, and translational movement of the perforator 18 relative to the filter 42 may be enough to provide a perforation in the filter 42.

In this example the perforator 18 perforates the filter 42 inside the cavity 14, with the filter 42 extending through the opening 14 and the perforator 18 remaining inside the cavity. However, in examples where the opening 14 is placed on/adjacent a surface of the filter 42, the perforator 18 may extend through the opening 14, and perforate the filter 42 outside of the cavity 16.

Although in this example the perforator 18 is illustrated as moving from a retracted configuration, in some examples (e.g. where the perforator 18 is fixed relative to the housing 12) the entire housing may be moved relative to the filter 42 to enable contact and perforation between the perforator 18 and the filter 42. In such examples, the perforator 18 may not move relative to the housing 12, and may be completely contained within the housing 12 (e.g. within the cavity 16).

Once the perforator 18 has perforated the filter 42, the perforator 18 may be withdrawn from contact with the filter 42, for example by configuring the perforator 18 to the retracted configuration once again (which may be done by simply allowing the biasing member 28 to pull the perforator 18 to the retracted configuration). Alternatively, the perforator 18 may be moved to the retracted configuration be moving the housing 12 relative to the filter 42, having the effect of moving the filter 42 through the opening 14. In such cases, the gripper 38 may be able to maintain a fluid seal, for example due to the deformable material on the gripper 38.

Figure 2E:
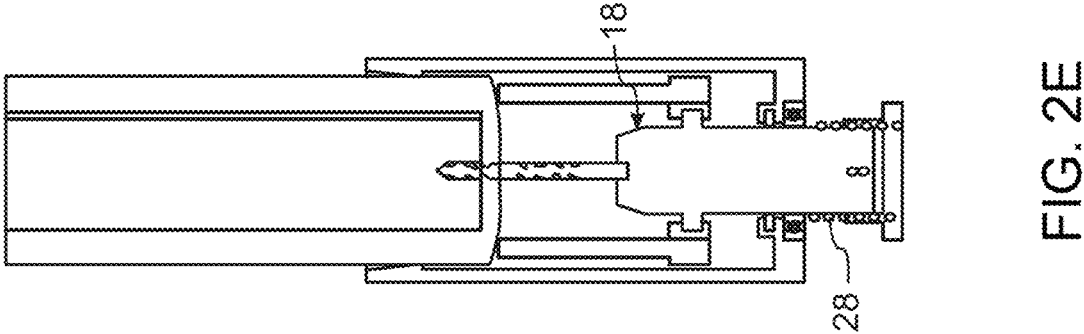
Figure 2D:
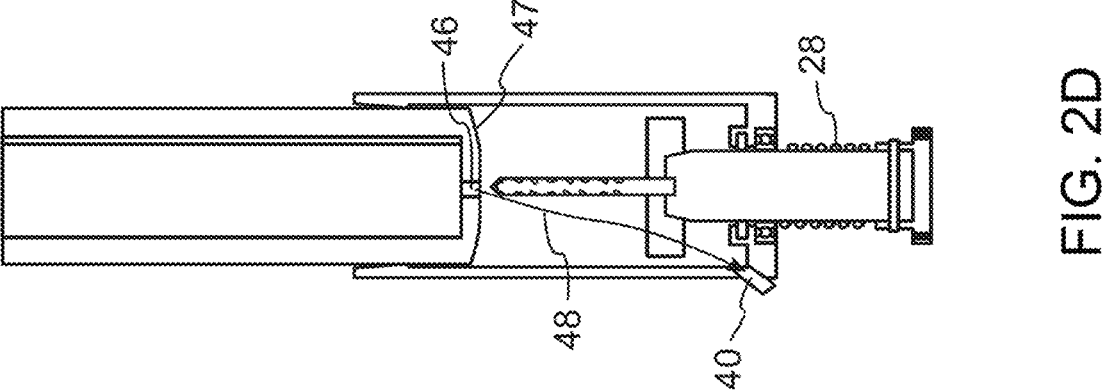

Once the perforator 18 has made a perforation 46, illustrated in FIG. 2*d*, the perforator 18 may be removed from contact with the filter 42 to permit a fluid to flow from inside the filter 42 into the cavity 16. A seal between the opening 14 and the filter 42 (which in this example is provided by the gripper 38, although it should be noted that a separate seal may be provided for this purpose that is not part of the gripper 38) assists to prevent leakage of fluid from the filter flowing through the opening 14. The fluid flows from the filter 42 and into the cavity 16. The fluid is then flowed from the cavity through outlet 40 via flowpath 48, and is thereby expelled from the housing 12. Although not illustrated, the outlet 40 may comprise a conduit attached thereto. The fluid may flow naturally through the outlet 40 (e.g. under gravity) or may be sucked or pumped out.

Once the filter 42 has been drained of fluid, the perforator 18 may be moved to a locked configuration as is illustrated in FIG. 2*e*. The locked configuration may require movement of the perforator 18 in a direction that positions the perforator 18 closer to the opening 14 than may be required to provide a perforation in the filter 42, thereby avoiding the situation where the perforator 18 is moved to the locked configuration during perforation of a filter 42. In the case where a sensor 45 or sensor arrangement is present, the sensor 45 may be able to identify when the perforator 18 has moved to the locked configuration, and may alert a user or controller. In the case where the tool 10 is connected to an operated by a robotic control device, the robotic control device may be programmed with predefined positions for the retracted configuration and locked configuration so as to position the perforator 18 in the desired configuration only when desired. In the locked configuration, the profile on the perforator 18 may engage with a locking profile or member in or on the housing 12, such that rotational movement of the perforator 18 relative to the housing is prevented or restricted. In this example, the perforator 18 engages with a profile on the stopper 34 (and as such the stopper 34 functions as a locking member), the stopper 34 being connected to the housing 12. To assist with the engagement between the perforator 18 and the housing 12, the perforator 18 comprises protrusions 36 which may engage with the stopper 34. In this example, the stopper 34 comprises a notch therein, or a plurality of notches, with each notch corresponding to a protrusion 36 on the perforator 18. Once the perforator 18 has been engaged with the stopper 34 and is in the locked configuration, the tool 10 may be rotated, resulting in corresponding rotation of the gripper 38 connected to the housing 12 and thereby the filter 42, and disengagement and removal of the filter 42 from the tool. To rotate the tool 10, the perforator 18 may be rotated, thereby also rotating the housing 12 and the gripper 38. Rotating the gripper 38 may therefore rotate the engaged filter 42.

In this example, the perforator 18 is moved to a locked configuration, in which the perforator 18 is located closer to the opening 14 than in the retracted configuration. In the locked configuration, the perforator 18 may be once again in contact with the filter 42, and in this example is illustrated as being inserted through the perforation 46. This may provide extra grip between the tool 10 and the filter 42. However, it should be noted that there is no need for the perforator 18 to directly contact the filter 42 in the locked configuration.

Although the steps illustrate the removal of a vehicle oil filter, it should be noted that such steps may also be applied for the engagement of the tool with another type of filter, such as an air filter, to remove the air filter from a vehicle. In some examples, the above steps may be modified as appropriate depending on the type of filter to be removed. For example, in the case of an air filter, the drainage of a fluid therefrom may not be necessary, and therefore the steps involving perforation of the filter may not need to be performed.

Figures 3A, 3B:
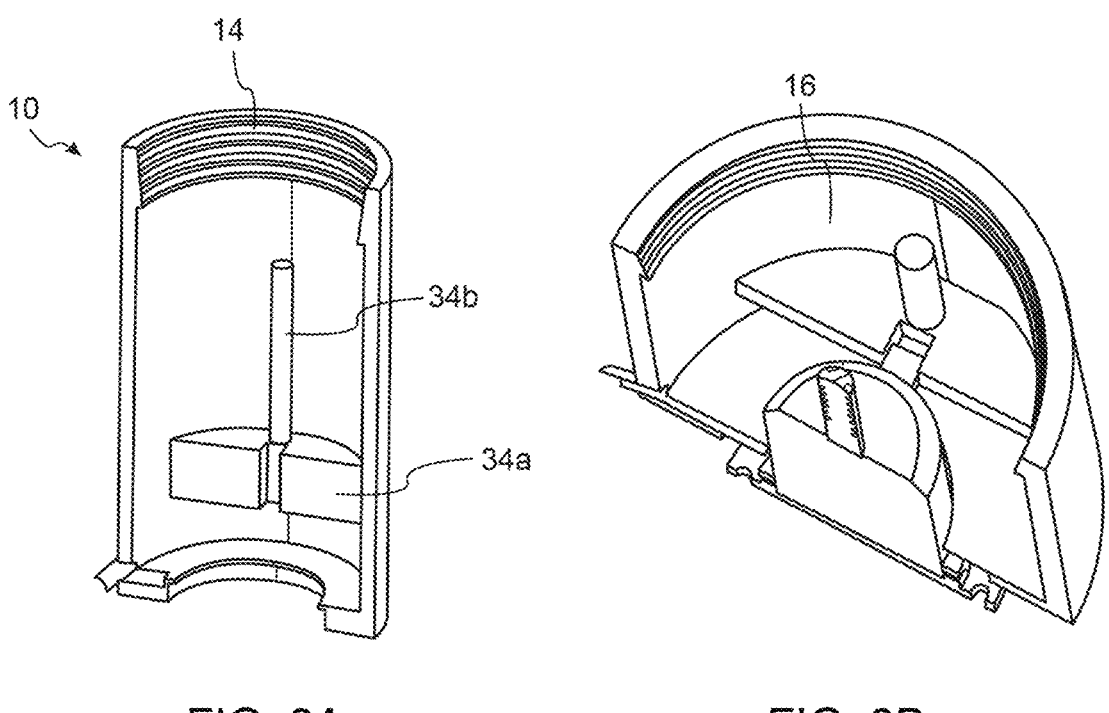
FIGS. 3a and 3b illustrate further detail of inside a cavity of the tool.

FIGS. 3*a* and 3*b* illustrate the tool 10 in further detail, in particular the tool inside the cavity 16.

Here, more detail of the stopper 34 is illustrated, including the base 34*a* and a protrusion 34*b* thereof. Here, the base 34*a* is illustrated comprising a component having the shape of a circular segment (e.g. a partial circle, or even a semi-circle may be possible) that is connected to the internal surface of the housing 12 inside the cavity 16. Although not illustrated, the base 34*a* may comprise two of such circular segment components and may be symmetrically disposed in the cavity 16. The protrusion 34*b* is in the form of a cylindrical rod protruding from a circular segment component of the base 34*a*. Where, two circular segment components exist, so too may two protrusions 34*b*. The base 34*a* additionally comprises a locking profile, and may therefore be a locking member. The protrusion 36 on the base 22 of the perforator 18 may be rotated and moved translationally relative to the stopper 34 to be engaged in the locking profile (e.g. the notch, as illustrated).

Figure 4:
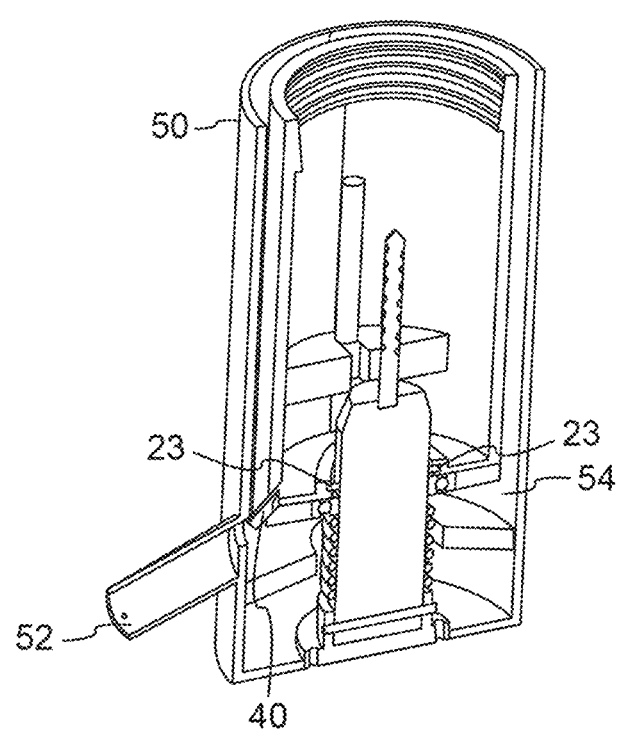
FIG. 4 illustrates an example of the tool having an outer receptacle.

FIG. 4 illustrates the tool 10 comprising an outer receptacle 50. The outer receptacle 50 may be a receptacle into which a fluid from the outlet 40 may be received. The housing 12 and the perforator 18 may be rotatably connected (e.g. rotatably coupled) to the outer receptacle 50. Here, the housing 12 of the tool 10 is located inside the outer receptacle 50, and may be fully or partially located in the outer receptacle 50. The perforator 18 is also located inside the outer receptacle 50. The outer receptacle 50 may permit the housing 12 and perforator 18 to be rotated to remove the tool, while the outer receptacle 50 remains stationary. As such, a fluid from the outlet 40 may be received in the outer receptacle 50, and may be expelled from the outer receptacle 50 at an outer receptacle outlet 52. The outer receptacle outlet 52 may comprise a conduit connected thereto, and may assist to avoid the situation whereby a conduit is twisted around the tool 10 when the housing 12 is rotated to remove a filter.

The outer receptacle 50 may comprise a sealing arrangement so as to provide a sealed cavity 54 between the housing 12 and the outer receptacle 50 in which a fluid may be contained, and expelled from outlet 52, for example in a similar way as has been described relative to outlet 40 above.

Figure 5:
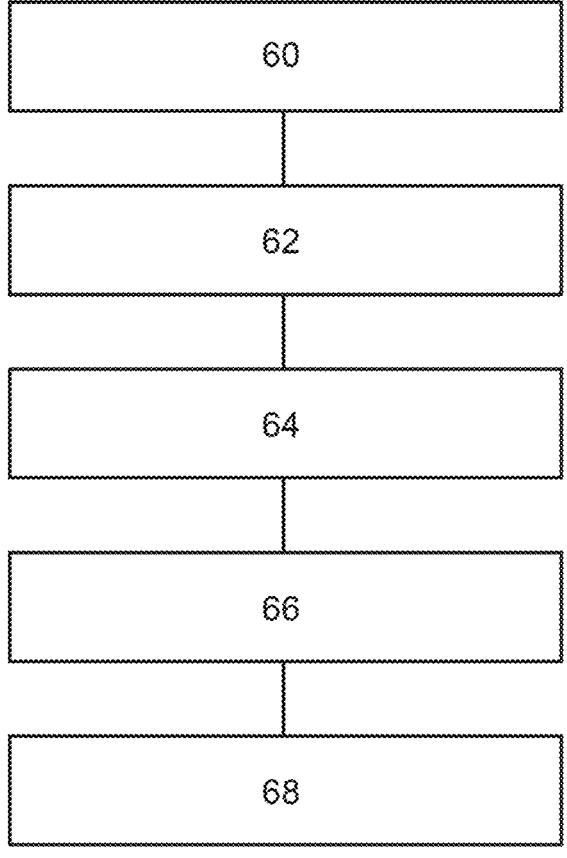
FIG. 5 illustrates the steps involved in the described method.

Illustrated in FIG. 5 is a representation of steps involved in the method for removing a vehicle filter 42 from a vehicle. Step 60 represents the step of engaging the gripper 38 of the tool 10 for draining and removing the filter 42, such that relative rotation between the gripper 38 and the filter 42 is restricted.

Step 62 represents perforating the vehicle filter 42 to form a perforation 46, while step 64 represents receiving a flow of fluid from the perforation 46 in the filter 42 into a cavity 16 of the tool housing 12 through the opening 14 therein.

Step 66 represents rotation of the tool 10, so as to rotate the filter 42 and removal of the filter 42 from a vehicle is represented in step 68.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A tool for draining and removing a vehicle filter from a vehicle, comprising:

a perforator for providing a perforation in the vehicle filter;

a housing comprising a cavity and an opening therein for receiving a fluid from a perforation in the vehicle filter into the cavity, the perforator at least partially located in the cavity, and the opening being configured such that at least one of the perforator and the vehicle filter are positionable therethrough; and a gripper connected to the housing and comprising a gripping surface for engaging and gripping the vehicle filter to restrict relative rotation between the gripper and the vehicle filter to permit rotation of the vehicle filter by rotation of the tool, wherein the perforator is rotatably connected to the housing via an annular bearing to permit rotational movement therebetween; and wherein the perforator is moveable from a retracted configuration in which the perforator is disengaged with the engaged vehicle filter in a direction towards the opening of the housing so as to perforate the engaged vehicle filter;

wherein the housing comprises a locking member and the perforator comprises a corresponding locking profile for engagement with the locking member, thereby restricting or preventing rotational movement between the perforator and the housing.

2. The tool according to claim 1, wherein the perforator comprises a spindle.

3. The tool according to claim 1, wherein the perforator is moveable to a locked configuration in which rotational movement of the perforator relative to the housing is restricted.

4. The tool according to claim 1, wherein the perforator comprises a connection profile for connection of a robotic control device thereto.

5. The tool according to claim 1, wherein the opening is configured to permit the vehicle filter to be positioned therethrough and the housing comprises a stopper configured to abut against the engaged vehicle filter to limit movement of the engaged vehicle filter through the opening.

6. The tool according to claim 1, wherein the gripper is located in the cavity of the housing.

7. The tool according to claim 1, wherein the gripper comprises a rubber gripping surface.

8. The tool according to claim 1, wherein the gripper comprises a clamp mechanism.

9. The tool according to claim 1, wherein the gripper is directly connected to the housing.

10. The tool according to claim 1, wherein the opening in the housing is configured to permit the vehicle filter to be partially inserted into the cavity through the opening.

11. The tool according to claim 1, comprising an outer receptacle, the housing being located at least partially within and rotatably connected to the outer receptacle to permit rotation between the housing and outer receptacle.

* * * * *